United States Patent [19]
Petit et al.

[11] Patent Number: 4,987,688
[45] Date of Patent: Jan. 29, 1991

[54] FRUIT-PROCESSING OVEN, PARTICULARLY FOR CONVERTING RAW PLUMS INTO PRUNES BY DESICCATION

[75] Inventors: Gaston Petit, Cergy; Daniel Monteiro, Laroque Timbaut, both of France

[73] Assignee: Auximat-Levage, Marines, France

[21] Appl. No.: 213,878

[22] Filed: Jun. 30, 1988

Related U.S. Application Data

[63] Continuation of Ser. No. 440, Nov. 5, 1987.

[30] Foreign Application Priority Data

Nov. 5, 1986 [FR] France .................. 86 15417

[51] Int. Cl.⁵ ............................................. F26B 19/00
[52] U.S. Cl. ............................................ 34/69; 34/77; 34/212; 34/219
[58] Field of Search ............ 34/78, 77, 202, 73, 34/207, 209, 212, 218, 219, 223, 225, 69

[56] References Cited

U.S. PATENT DOCUMENTS 1,075,981 10/1913 Koehler ........................... 34/78

FOREIGN PATENT DOCUMENTS

| 79523 | 5/1983 | European Pat. Off. . |
| 2746927 | 4/1978 | Fed. Rep. of Germany . |
| 3248581 | 7/1984 | Fed. Rep. of Germany . |
| 2535445 | 5/1984 | France . |
| 2538887 | 7/1984 | France . |
| 2551538 | 3/1985 | France . |
| 2556106 | 12/1985 | France . |
| 2079913 | 1/1982 | United Kingdom . |

Primary Examiner—Henry A. Bennet
Attorney, Agent, or Firm—Armstrong, Nikaido, Marmelstein, Kubovcik & Murray

[57] ABSTRACT

An oven for converting raw plums into prunes by desiccation comprises an enclosure (1) with a double heat-insulated wall arranged as a tunnel and provided with air curtains (2 and 3) at its inlet and at its outlet. The air-agitation means recirculate a portion of the air within the enclosure, after filtration and condensation of water vapor on a cold wall. Electrical heating elements (65) are placed downstream of the device for condensing water vapor (60). The recovery duct (51) and blower duct (71) are placed laterally on opposite sides of the tunnel.

3 Claims, 3 Drawing Sheets

FRUIT-PROCESSING OVEN, PARTICULARLY FOR CONVERTING RAW PLUMS INTO PRUNES BY DESICCATION

This application is a continuation of PCT application PCT/FR 87/00440 filed Nov. 5, 1987, and designating the U.S., and which claims priority based upon French patent application 86 15417, filed Nov. 5, 1986.

The invention relates to fruit processing, more particularly the desiccation of raw plums for converting them into prunes. This operation, which was first done under the sun, now calls for the use of ovens. So far, conventional ovens have been used for this purpose, most often those made of bricks and being completely closed. Moreover, those ovens operate with entirely fresh air that it discharged subsequently.

As a result, the proportional cost of converting plums to prunes is due mainly to the calories expended to accomplish this, calculated at the present time to be approximately 50 centimes per kilogram of prunes. Such costs, where production is concerned, are far from being insignificant.

This invention has for its object a reduction in the cost of converting raw plums to prunes. Another object of the invention is to provide an installation permitting automatic operation, especially the use of an oven that is not necessarily closed. The oven proposed for this purpose is of the type comprising an enclosure provided with means of heating air and means of agitating it.

In accordance with one aspect of the invention, the enclosure, which has a double heat-insulated wall, is defined as a tunnel provided with means of forming an air curtain at its entrance, as well as an air curtain at it exit; and the air-agitation means effect a total recirculation of the air contained in the enclosure after filtering and condensation of water vapor on a cold wall.

It is advantageous for the heating means to include electrical heating components placed downstream of the water-vapor condensing device. In accordance with another aspect of the invention, the agitation means operates between a recovery duct and a blower duct located laterally on opposite sides of the tunnel.

The oven preferably comprises at least one chain conveyor or metal conveyor belt defining at least one level of support for a stack of trays inside the heat-insulated enclosure. However, the operation may be carried out also by means of trolleys to carry a stack of trays inside the enclosure. In an interesting mode of embodiment, the trays are supported by cross members which help in the recovery of air.

It is then of advantage to have the blower means include nozzles to direct the recycled hot air toward the upper and/or lower portion of the trays.

Other features and advantages of the invention will become apparent on examining the detailed description below, as well as the accompanying drawings in which.

The accompanying drawings comprise geometric elements that are specific in nature. Accordingly, they may not only serve for a better understanding of the detailed description below but may also contribute to defining the invention, if need be.

Figure 1:
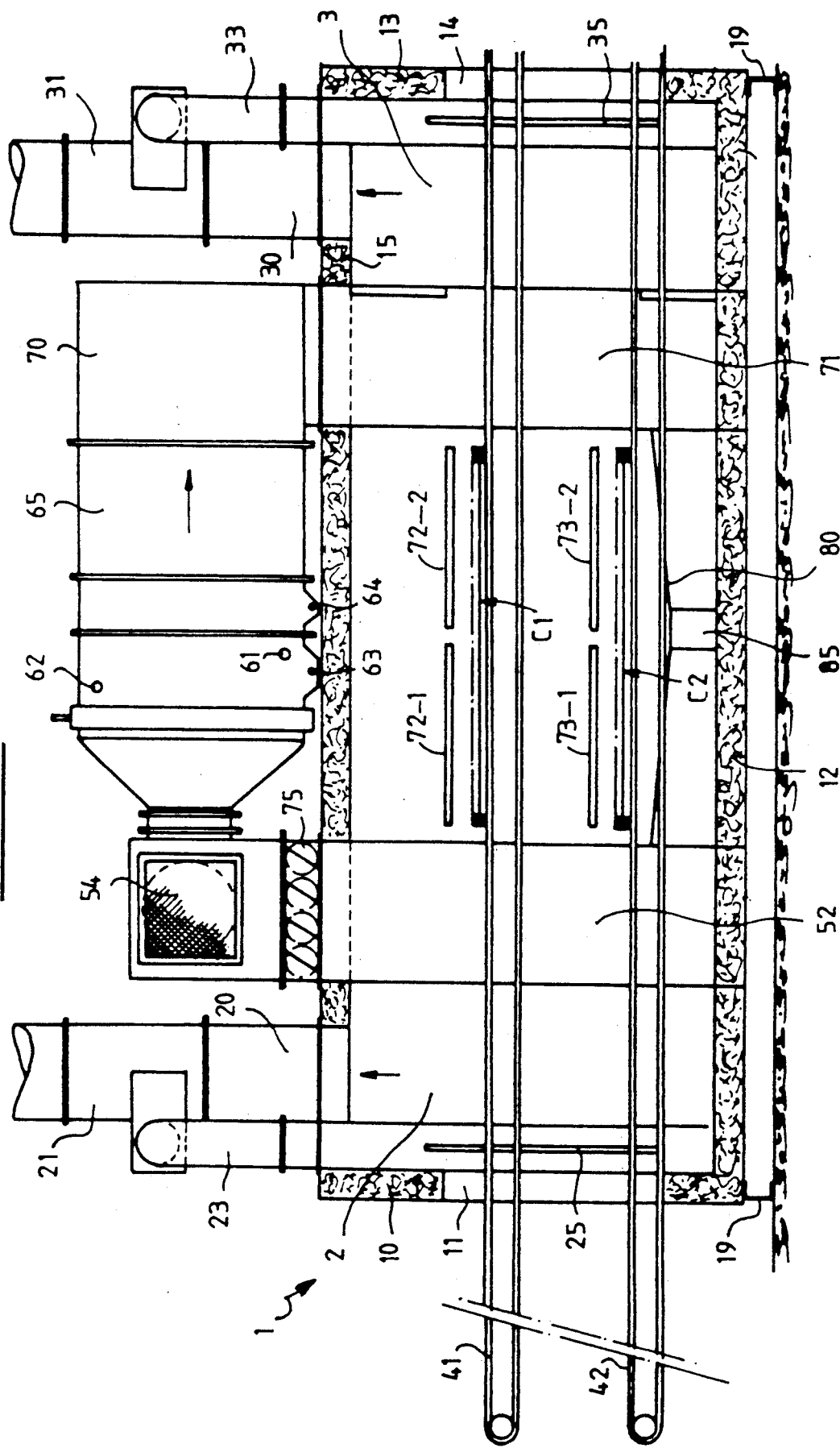
FIG. 1 is a longitudinal sectional view of an oven in accordance with the invention.
Figure 2:
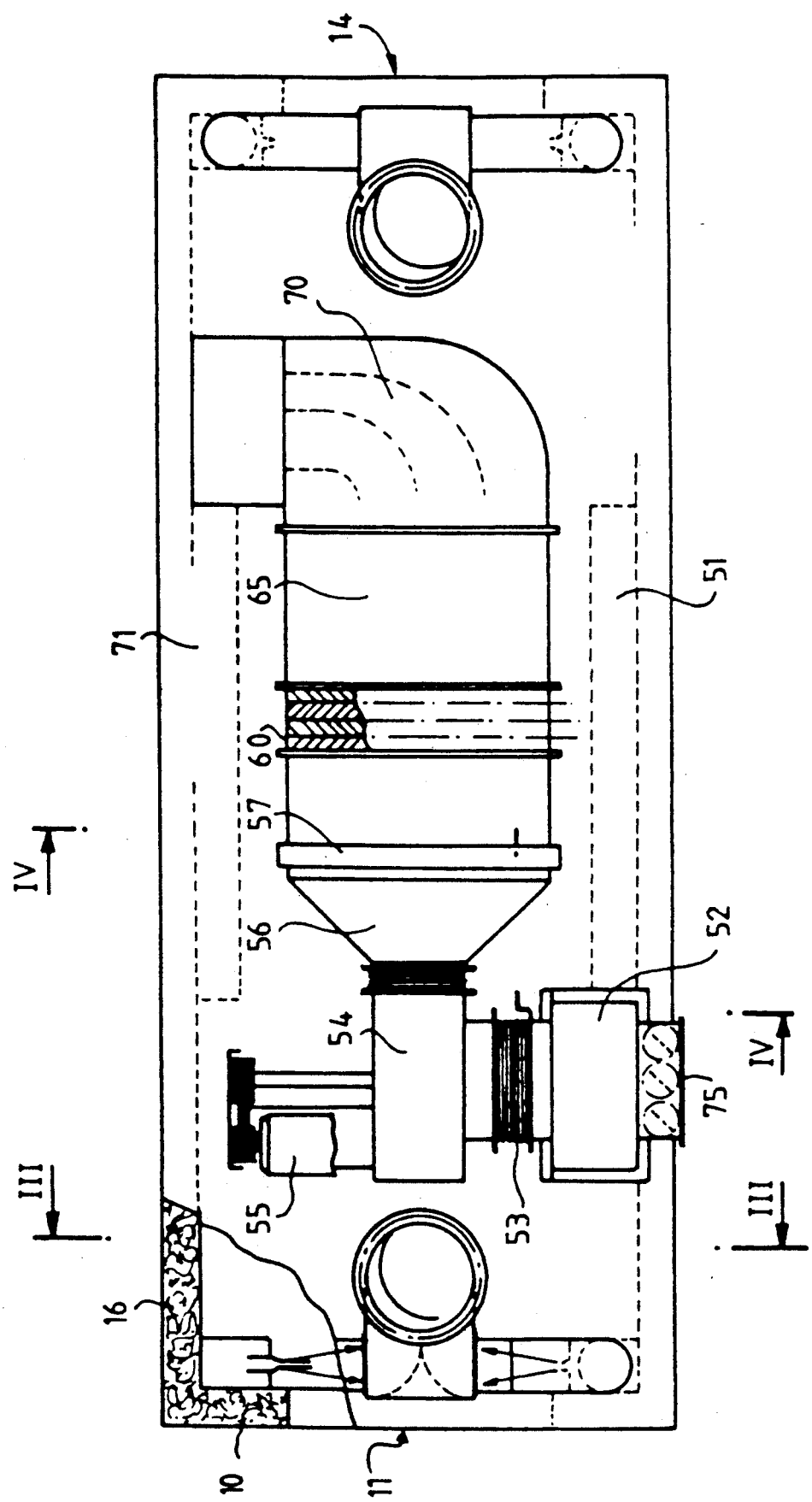
FIG. 2 is a top plan view of the oven in accordance with the invention, with a partial cut-away in the upper lefthand corner.
Figure 3:
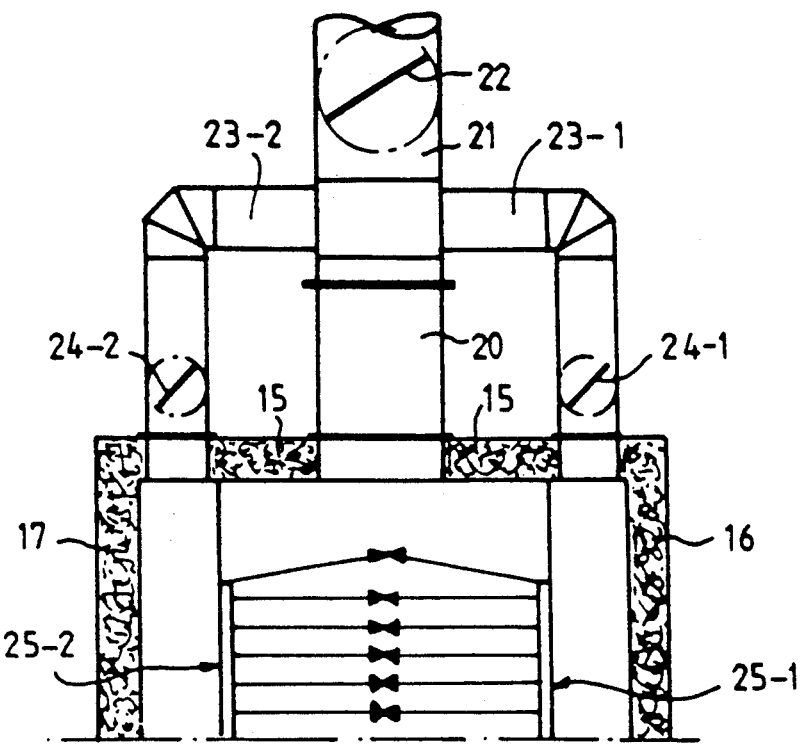
FIG. 3 is a cross-sectional view taken along the line III—III in FIG. 2.

In FIG. 1 the oven enclosure is designated generally by the numeral 1. It comprises a double wall, the two walls being separated by fiber glass. Thus its left-end wall 10 defines an entryway 11. In FIG. 1 can be seen the fiber glass filling which extends throughout the length of the enclosure. On the right, a vertical wall 13 has an opening for the exit 14. The upper portion of the enclosure can be seen at 15. In FIG. 2 the side 16 of the enclosure can be seen, which is also shown in FIG. 3. It is in the latter figure that the opposite said 17 of this enclosure can be seen.

The entryway 11 is closed off by an air curtain 2 when the support mode for the stacks of trays is a conveyor belt, or by a silhouette entry (not shown) when the support mode is a trolley. The air curtain 2 is defined by a recovery fan 20 the outlet duct 21 of which communicates with the ambient air via an adjustable register 22. The blown air is retransmitted, by elbowed, lateral ducts 23-1 and 23-2, toward other adjusting registers 24-1 and 24-2 that finally lead the air down toward two outlet slots 25-1 and 25-2 that are positioned opposite each other.

A similar arrangement is provided for the exit passage 14, Components 3 are involved, which are similar to the components of the entryway 2 and are identified by the same numerical references increased by 10 units.

Trays can be moved in individually on two moving belts 41 and 42 that extend throughout the oven, if need be through openings provided in the wall. Such openings for the lower portion of the lower moving belt can be seen in the double walls of ends 10 and 13. This moving belt permits moving trays C1 and C2 into the central portion of the oven.

At this level, both portions of each conveyor belt straddle cross members 50-1 and 50-2 (FIG. 4), which are provided with means that enable the recovery of air and transfer of that air to a lateral recovery duct 51 adjacent to wall 17. This recovery duct 51 connects with a recovery tank 52 (FIG. 2) that communicates, via a flexible sleeve 53, with the intake port of a mixing fan 54, the shaft of which is driven by two belts from an electric motor 55. The outlet diffuser 56 of the fan is linked to a filter 57 that can be a conventional filter such as is used in kitchen installations, of France Air or similar brand.

The filter 57 is followed, at 60, by a cooling unit that consists of an exchanger to which cold water is fed.

In FIG. 1 the water-entry port of the exchanger can be seen at 61, and the exit port can be seen at 62. This figure also shows cups provided in the lower portion of the duct that accommodates the condensation unit, which are provided with orifices for discharge of the condensates 63 and 64. Then the air passes into an electrical heating unit 65 which can be supplied with electrical-heating power that is proportional to the production involved.

Figure 4:
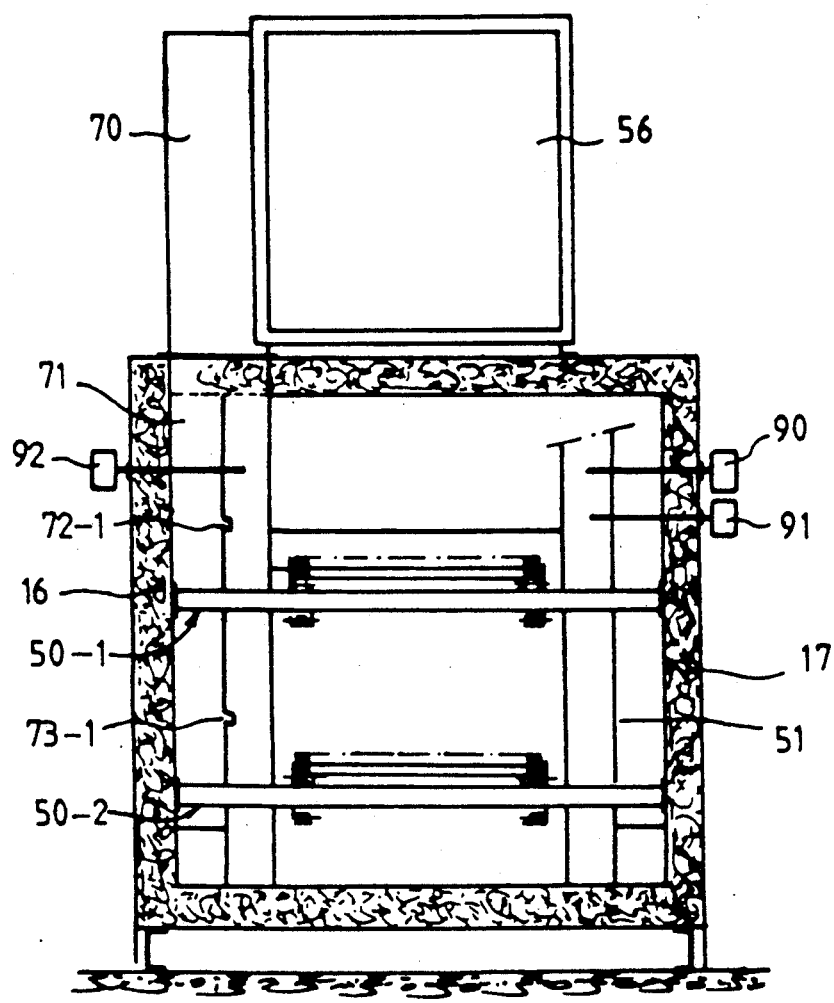
FIG. 4 is a cross-sectional view taken along the line IV—IV in FIG. 2.

After filtering, condensation and heating, the recycled air reaches the curved blower tank 70, then proceeds to a lateral blower duct 71 next to the wall 16 (FIG. 4). That duct 71 is provided with nozzles 72-1 and 72-2 above, as well as 73-1 and 73-2 below, to permit blowing air over the entire surface of each of the trays and/or levels of the moving belts that are in the heating chamber.

Alongside the recovery tank 52 is provided a register unit 75 that makes possible the adjustment of the provision of fresh air inside the enclosure in accordance with the invention.

Whereas prior art utilized completely fresh air for drying out plums, it has been proven that, by using the device in accordance with the invention, it is satisfactory to change the air at the rate of approximately four to five volumes per hour. Under these conditions, fine quality prunes can be produced at a proportional cost (energy consumption) that can be as little as one tenth of the cost heretofore.

Naturally, one must make sure that the oven is controlled in accordance with the invention. This is accomplished with the help of a temperature sensor 90, a relative humidity sensor 91, and a high-temperature (safety) sensor 92. These sensors are shown in FIG. 4.

We claim:

1. A fruit-processing oven for drying and converting raw fruit by desiccation comprising an enclosure (1) provided with means for heating air, trays for supporting fruit and means for agitating air, characterized in that said enclosure (1), which has a double heat-insulated wall (10-17), is defined as a tunnel provided with means (2,3) for forming an air curtain at its entrance and at its exit, and in that said air agitation means (50-73) recirculate all of the air within said enclosure, after filtration (57) and condensation of water vapor (60) on a cold all, and blower means including nozzles (72, 73) for directing recirculated air toward the upper and/or lower portions of said trays.

2. The oven as set forth in claim 1, characterized in that the heating means comprise electrical heating elements (65) provided downstream of the device for condensing water vapor (60).

3. The oven as set forth in any one of claims 1 and 2, characterized in that the air agitation means operates between a recovery duct (51) and a blower duct (71) located laterally on opposite sides of the tunnel.

4. The oven as set forth in claim 1, characterized in that said oven comprises at least one conveyor chain (41, 42) that defines at least one level of support for a stack of trays within said enclosure.

5. The oven as set forth in claim 1, characterized in that the trays are supported by cross members (50) that contribute to the recovery of air.

* * * * *